US008253719B2

(12) United States Patent
Park et al.

(10) Patent No.: US 8,253,719 B2
(45) Date of Patent: Aug. 28, 2012

(54) LIQUID CRYSTAL DISPLAY DEVICE AND METHOD WITH A REDUCED NUMBER OF DELAY DEVICES FOR DISCHARGING REMAINING PIXEL CHARGES

(75) Inventors: Won Yong Park, Daegu-si (KR); Chang In Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 981 days.

(21) Appl. No.: 11/966,678

(22) Filed: Dec. 28, 2007

(65) Prior Publication Data

US 2008/0180429 A1 Jul. 31, 2008

(30) Foreign Application Priority Data

Jan. 29, 2007 (KR) ........................ 10-2007-0008892

(51) Int. Cl.
*G06F 0/38* (2006.01)

(52) U.S. Cl. ........................................................ 345/211

(58) Field of Classification Search .................. 345/204, 345/208–215, 87, 92–95, 99–100
See application file for complete search history.

(56) References Cited

U.S. PATENT DOCUMENTS 5,248,963 A * 9/1993 Yasui et al. ...................... 345/98
6,166,726 A * 12/2000 Uchida et al. ................. 345/211
7,109,965 B1 * 9/2006 Lee et al. ........................ 345/98
2005/0231501 A1 * 10/2005 Nitawaki ...................... 345/211
2006/0066550 A1 * 3/2006 Huang et al. .................... 345/92
2007/0057898 A1 * 3/2007 Nakajima et al. ............. 345/100

FOREIGN PATENT DOCUMENTS

JP 05-276737 10/1993
JP 2002-123234 4/2002
JP 2004-226597 8/2004

OTHER PUBLICATIONS

Office Action issued in corresponding Japanese Patent Application No. 2007-324445, mailed Jan. 24, 2011.

* cited by examiner

*Primary Examiner* — Liliana Cerullo
(74) *Attorney, Agent, or Firm* — Brinks Hofer Gilson & Lione

(57) ABSTRACT

A liquid crystal display device and a method of driving the same is disclosed, which can minimize the number of delay devices to delay a discharging time by a preset period of time. The liquid crystal display device comprises a first pumping unit that first pumps a high-potential power source voltage applied; a second pumping unit that generates a gate high voltage by pumping the high-potential power source voltage first pumped in the first pumping unit; a level shifter that shifts an input high voltage to a level corresponding to that of the gate high voltage from the second pumping unit, and supplies the gate high voltage to a discharging circuit; and a delay device, connected between input and output sides of the second pumping unit, that maintains the gate high voltage output from the level shifter for a preset period of time.

14 Claims, 5 Drawing Sheets

LIQUID CRYSTAL DISPLAY DEVICE AND METHOD WITH A REDUCED NUMBER OF DELAY DEVICES FOR DISCHARGING REMAINING PIXEL CHARGES

CLAIM FOR PRIORITY

This application claims the benefit of Korean Patent Application No. 2007-8892 filed Jan. 29, 2007, which is hereby incorporated by reference as if fully set forth herein.

BACKGROUND OF THE INVENTION

1. Field of the Invention

The present invention relates to a liquid crystal display device, and more particularly, to a liquid crystal display device which can minimize the number of delay devices to delay a discharging time by a preset period of time, and a method of driving the same.

2. Discussion of the Related Art

Generally, a liquid crystal display device displays images by controlling light transmittance of liquid crystal cells on the basis of video signals. Particularly, an active matrix type LCD device (hereinafter, referred to as "AM LCD device") is suitable for displaying moving images because the AM LCD device includes switching elements formed in liquid crystal cells respectively. Typically, the switching elements are formed of thin film transistors TFT, as shown in FIG. 1.

Referring to FIG. 1, the AM LCD device converts digital input data to analog data voltages with reference to a gamma reference voltage, supplies the analog data voltages to data lines DL, and supplies scan pulses to gate lines GL, at the same time.

The thin film transistor TFT is provided with a gate electrode, a source electrode and a drain electrode. The gate electrode of thin film transistor TFT is connected to the gate line GL, the source electrode thereof is connected to the data line DL, and the drain electrode thereof is connected to a pixel electrode of liquid crystal cell Clc and one electrode of storage capacitor Cst. Also, a common electrode of liquid crystal cell Clc is supplied with a common voltage Vcom.

The storage capacitor Cst is charged with a data voltage applied from the data line DL when the thin film transistor TFT is turned-on, thereby maintaining a voltage of liquid crystal cell Clc at a constant level.

When the scan pulse is applied to the gate line GL, the thin film transistor TFT is turned-on, whereby a channel is formed between the source and drain electrodes. Thus, the voltage of data line DL is supplied to the pixel electrode of liquid crystal cell Clc. As an alignment in liquid crystal molecules of the liquid crystal cell Clc is changed by an electric field between the pixel electrode and the common electrode, there is a modulation of incident light passing therethrough.

The related art liquid crystal display device including pixels of the aforementioned structure discharges remaining charges from the pixels by using a discharging circuit (not shown) when the supply of power-source voltage VCC is stopped. After the supply of power-source voltage is stopped, the discharging circuit supplies a gate high voltage VGH to the gate line GL for a preset period of time, thereby discharging the remaining charges of pixels through the data line DL. The discharging circuit maintains the supply time of gate high voltage VGH at a constant period of time by using a plurality of low-capacitance capacitors (for example, about 15 low-capacitance capacitors).

The related art liquid crystal display device includes the discharging circuit provided with about 15 low-capacitance capacitors. Accordingly, the related art liquid crystal display device has an increasing fabrication cost and a complicated circuit structure.

SUMMARY

A liquid crystal display device comprises a first pumping unit for firstly pumping a high-potential power source voltage applied; a second pumping unit for generating a gate high voltage by secondarily pumping the high-potential power source voltage firstly pumped in the first pumping unit; a level shifter for shifting an input high voltage to a level corresponding to that of the gate high voltage from the second pumping unit, and supplying the gate high voltage to a discharging circuit; and a delay device, connected between input and output sides of the second pumping unit, for maintaining the gate high voltage output from the level shifter for a preset period of time.

In another aspect, a liquid crystal display device comprises a first pumping unit for firstly pumping a high-potential power source voltage applied; a second pumping unit for secondarily pumping the high-potential power source voltage firstly pumped in the first pumping unit; a level shifter for shifting an input high voltage to a level corresponding to that of the gate high voltage from the second pumping unit, and supplying the gate high voltage to a discharging circuit; and a delay device, connected between input and output sides of the first pumping unit, for maintaining the gate high voltage output from the level shifter for a preset period of time.

In another aspect, a method of driving a liquid crystal display device comprises firstly pumping a high-potential power source voltage by a first pumping unit; generating a gate high voltage by secondarily pumping the high-potential power source voltage firstly pumped in the first pumping unit by a second pumping unit; supplying a gate low voltage to a discharging circuit by a level shifter if a low voltage is inputted to the level shifter; shifting a high voltage to a level of the gate high voltage generated in the second pumping unit by the level shifter, and supplying the gate high voltage to the discharging circuit, if the high voltage is input to the level shifter; and maintaining the gate high voltage output from the level shifter for a preset period of time by a delay device connected between input and output sides of the second pumping unit.

In the other aspect, a method of driving a liquid crystal display device comprises firstly pumping a high-potential power source voltage by a first pumping unit; generating a gate high voltage by secondarily pumping the high-potential power source voltage firstly pumped in the first pumping unit by a second pumping unit; supplying a gate low voltage to a discharging circuit by a level shifter if a low voltage is inputted to the level shifter; shifting a high voltage to a level of the gate high voltage generated in the second pumping unit by the level shifter, and supplying the gate high voltage to the discharging circuit, if the high voltage is input to the level shifter; and maintaining the gate high voltage output from the level shifter for a preset period of time by a delay device connected between input and output sides of the first pumping unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display device according to the preferred embodiments of the present disclosure and a method of driving the same will be explained with reference to the accompanying drawings.

Figure 1:
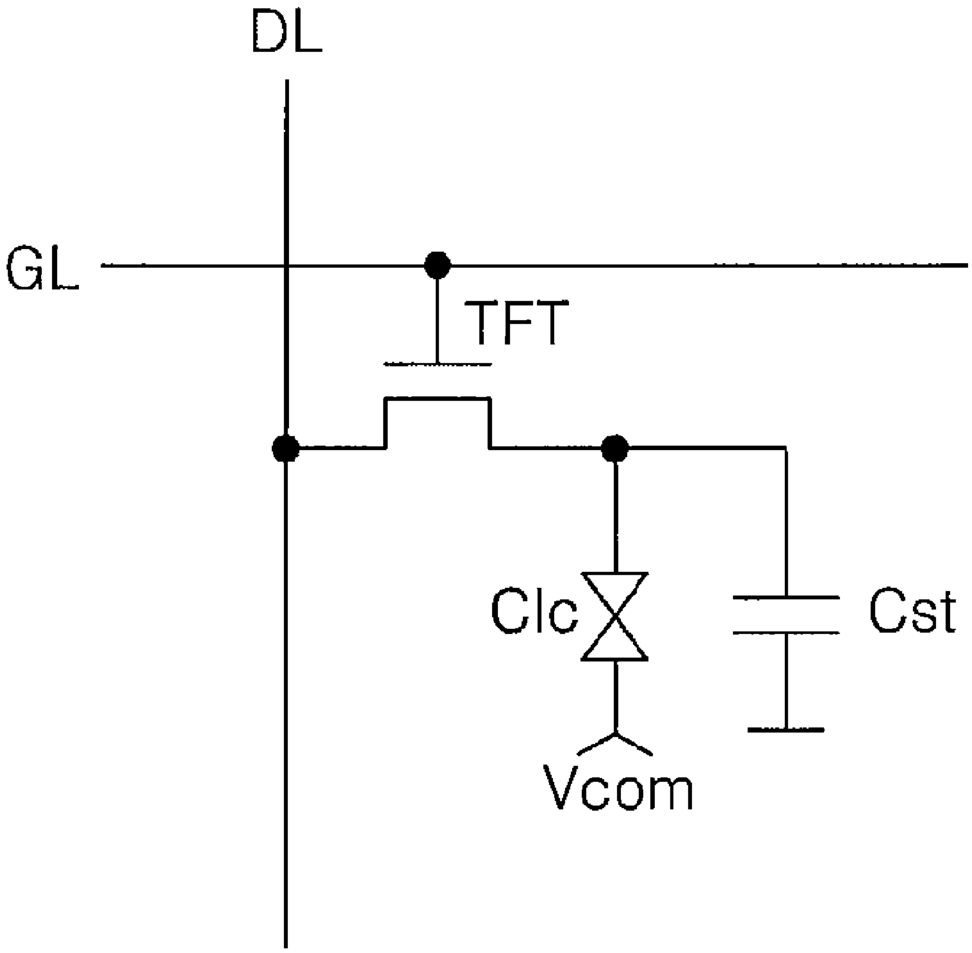
FIG. 1 PRIOR ART
FIG. 1 is an equivalent circuit diagram of illustrating each pixel of a liquid crystal display device according to the related art.
Figure 2:
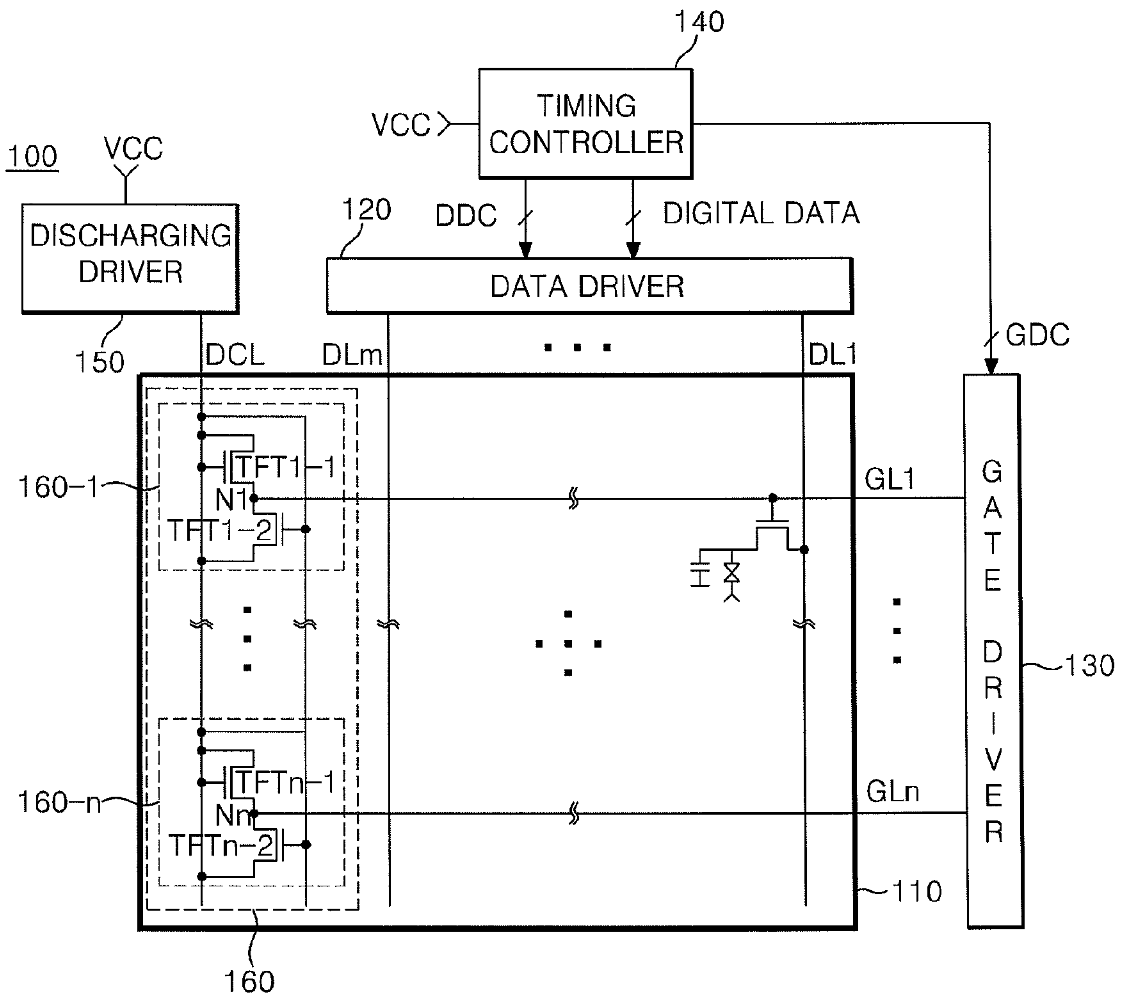
FIG. 2 is a diagram of illustrating a liquid crystal display device according to one preferred embodiment of the present disclosure.

FIG. 2 is a diagram of illustrating a liquid crystal display device according to one preferred embodiment of the present disclosure.

Referring to FIG. 2, a liquid crystal display device 100 of the present disclosure is comprised of a liquid crystal display panel 110 which includes a plurality of gate lines GL1 to GLn, a plurality of data lines DL1 to DLm and a plurality of thin film transistors TFT. Each of the gate lines crosses each of the data lines, and each thin film transistor TFT for driving liquid crystal cell Clc is formed at a crossing portion of the gate and data lines GL and DL. A data driver 120 supplies data to the plurality of data lines DL1 to DLm of the liquid crystal display panel 110. A gate driver 130 supplies data to the plurality of gate lines GL1 to GLn of the liquid crystal display panel 110. A timing controller 140 controls the data driver 120 and the gate driver 130. A discharging driver 150 controls discharging for each pixel formed in the liquid crystal display panel 110. A discharging circuit 160 discharges each pixel under control of the discharging driver 150.

The liquid crystal display panel 110 includes two substrates of lower and upper substrates, and a liquid crystal layer formed by injecting liquid crystal into a space between the two substrates. On the lower glass substrate, there are the plurality of gate lines GL1 to GLn, the plurality of data lines DL1 to DLm and the plurality of thin film transistors TFT, wherein each gate line crosses each data line, and each thin film transistor TFT is formed at the crossing portion of the gate and data lines. In response to a scan pulse, the thin film transistor TFT supplies the data of data lines DL1 to DLm to the liquid crystal cell Clc. In this case, a gate electrode of the thin film transistor TFT is connected to the gate lines GL1 to GLn, a source electrodes thereof is connected to the data lines DL1 to DLm, and a drain electrode thereof is connected to a pixel electrode of liquid crystal cell Clc and a storage capacitor Cst.

The thin film transistor TFT is turned-on in response to the scan pulse supplied to its own gate electrode through the corresponding gate line among the plurality of gate lines GL1 to Gln. When the thin film transistor TFT is turned-on, video data of the corresponding data line connected to the drain electrode of the thin film transistor TFT is supplied to the pixel electrode of liquid crystal cell Clc.

The data driver 120 supplies data to the data lines DL1 to DLm in response to a data-driving control signal DDC supplied from the timing controller 140. Also, the data driver 120 samples and latches digital data (RGB data or RGBW data) supplied from the timing controller 140, converts the sampled and latched data into analog data voltages to display gray scales in the liquid crystal cell Clc of liquid crystal display panel 110 with reference to a gamma reference voltage supplied from a gamma reference voltage generator (not shown), and supplies the analog data voltages to the data lines DL1 to DLm.

The gate driver 130 sequentially generates the scan pulses, that is, gate pulse in response to a gate-driving control signal GDC and a gate shift clock GSC supplied from the timing controller 140, and supplies the generated scan pulses to the gate lines GL1 to GLn. The gate driver 130 determines the high-level voltage or low-level voltage of each scan pulse according to a gate high voltage VGH and a gate low voltage VGL supplied from a gate-driving voltage generator (not shown). The gate-driving voltage generator (not shown) receives a high-potential power source voltage VDD, generates the gate high voltage VGH and the gate low voltage VGL, and supplies the generated gate high voltage VGH and gate low voltage VGL to the gate driver 130. The gate-driving voltage generator generates the gate high voltage VGH which is higher than a threshold voltage of the thin film transistor TFT included in each pixel of the liquid crystal display panel 110, generates the gate low voltage VGL which is lower than the threshold voltage of the thin film transistor TFT, and supplies the generated gate high voltage VGH and gate low voltage VGL to the gate driver 130.

Also, an inverter (not shown) converts a square-wave signal generated therein into a triangle-wave signal, compares the triangle-wave signal with a D.C. power source voltage VCC supplied from the system, and generates a burst dimming signal in proportion to the comparison result. IN order to generate the burst dimming signal determined based on the square-wave signal generated inside the inverter, a driving IC (not shown) controls the generation of an A.C. voltage and current in the inverter controls generation of the A.C. voltage and current supplied to a backlight assembly (not shown) according to the burst dimming signal.

The timing controller 140 supplies the digital data (RGB data or RGBW data) supplied from the system to the data driver 120. Also, the timing controller 140 generates the gate-driving control signal GDC and data-driving control signal DDC by using horizontally and vertically synchronized signals H and V according to a clock signal CLK, and supplies the data-driving control signal DDC and the gate-driving control signal GDC to the data driver 120 and the gate driver 130, respectively.

The data-driving control signal DDC includes a source shift clock SSC, a source start pulse SSP, a polarity control signal POL, a source output enable signal SOE. The gate-driving control signal GDC includes a gate start pulse GSP, a gate shift clock GSC and a gate output enables GOE.

The discharging driver 150 generates the high-potential power source voltage VDD by receiving the D.C. power source voltage VCC, and generates the gate high voltage VGH having the same level as the high level of scan pulse by pumping the high-potential power source voltage VDD. Then, the discharging driver 150 detects the level of the D.C.

power source voltage VCC applied, and outputs the gate low voltage VGL or the gate high voltage VGH to the discharging circuit 160 according to the detected voltage level. That is, the discharging driver 150 controls the discharging circuit 160 such that the discharging circuit 160 doesn't perform discharging of each pixel during a normal driving period where the power source voltage VCC is applied to the liquid crystal display device 100, and the discharging circuit 160 performs discharging of remaining charges from each pixel at a constant period of time when the supply of power source voltage VCC is stopped.

The discharging circuit 160 is comprised of first to 'n'th discharging parts 160-1 to 160-n whose input sides are connected to a discharging line DCL in common, and whose output sides are connected in one-to-one correspondence with the gate lines GL1 to GLn. That is, the output side of first discharging part 160-1 positioned at the first horizontal line is connected to the first gate line GL1, and the output side of 'n'th discharging part 160-n positioned at the final horizontal line is connected to the final gate line GLn.

When the level of the D.C. power source voltage VCC supplied to the liquid crystal display device 100 is lowered below a preset reference voltage level, the first to 'n'th discharging parts 160-1 to 160-n receive the gate high voltage VGH having the level corresponding to the high level of scan pulse from the discharging driver 150, to thereby discharge the remaining charges from each pixel of the liquid crystal display panel 110. That is, if the gate high voltage VGH is supplied from the discharging driver 150 during the period in which the data voltage is not supplied to the data lines DL1 to DLm, the first to 'n'th discharging parts 160-1 to 160-n supply the gate high voltage VGH to the corresponding gate line connected thereto. Thus, the thin film transistor TFT of each pixel is turned-on so that the remaining charges of each pixel are discharged through the data lines DL1 to DLm.

Each of the first to 'n'th discharging parts 160-1 to 160-n is provided with two thin film transistors TFT of the same structure, connected between the discharging line DCL and the corresponding gate line GL. For example, the circuit structure of the first and 'n'th discharging parts 160-1 and 160-n respectively connected to the first gate line GL1 and the final gate line GLn will be explained as follows.

The first discharging part 160-1 includes the thin film transistors TFT1-1 and TFT1-2 connected between the discharging line DCL and the gate line GL1 in series. The thin film transistor TFT1-1 is provided with gate and drain connected to the discharging line DCL, and a source connected to the gate line GL1 and a drain of the thin film transistor TFT1-2 in common. The thin film transistor TFT1-2 is provided with gate and source connected to the discharging line DCL, and a drain connected to the gate line GL1 and the source of thin film transistor TFT1-1 in common. At this time, the gate line GL1 is connected to an output node N1 which is positioned between the source of thin film transistor TFT1-1 and the drain of thin film transistor TFT1-2.

If the discharging driver 150 supplies the gate low voltage VGH below 0V through the discharging line DCL, the thin film transistors TFT1-1 and TFT 1-2 are turned-off, so that the first discharging part 160-1 doesn't supply the voltage to the gate line GL1. In this case, the remaining charges are not discharged from the pixels connected to the gate line GL1.

If the discharging driver 150 supplies the gate high voltage VGH through the discharging line DCL, the thin film transistors TFT1-1 and TFT1-2 are turned-on, so that the first discharging part 160-1 discharges the remaining charges from the pixels connected to the gate line GL1 by supplying the gate high voltage VGH to the gate line GL1. At this time, the thin film transistors TFT of pixels connected to the gate line GL1 are turned-on by the gate high voltage VGH supplied to the first discharging part 160-1, thereby supplying the remaining charges of pixels to the data lines DL.

The 'n'th discharging part 160-n includes thin film transistors TFTn-1 and TFTn-2 connected between the discharging line DCL and the gate line GLn in series. The thin film transistor TFTn-1 is provided with gate and drain connected to the discharging line DCL, and a source connected to the gate line GLn and a drain of thin film transistor TFTn-2 in common. The thin film transistor TFTn-2 is provided with gate and source connected to the discharging line DCL, and a drain connected to the gate line GLn and the source of thin film transistor TFTn-1 in common. At this time, the gate line GLn is connected to an output node Nn which is positioned between the source of thin film transistor TFTn-1 and the drain of thin film transistor TFTn-2.

If the discharging driver 150 supplies the gate low voltage VGH below 0V through the discharging line DCL, the thin film transistors TFTn-1 and TFTn-2 are turned-off, so that the 'n'th discharging part 160-n doesn't supply the voltage to the gate line GLn. In this case, the remaining charges are not discharged from the pixels connected to the gate line GLn.

If the discharging driver 150 supplies the gate high voltage VGH through the discharging line DCL, the thin film transistors TFTn-1 and TFTn-2 are turned-on, so that the 'n'th discharging part 160-n discharges the remaining charges from the pixels connected to the gate line GLn by supplying the gate high voltage VGH to the gate line GLn. At this time, the thin film transistors TFT of pixels connected to the gate line GLn are turned-on by the gate high voltage VGH supplied to the 'n'th discharging part 160-n, thereby supplying the remaining charges of pixels to the data lines DL.

Figure 3:
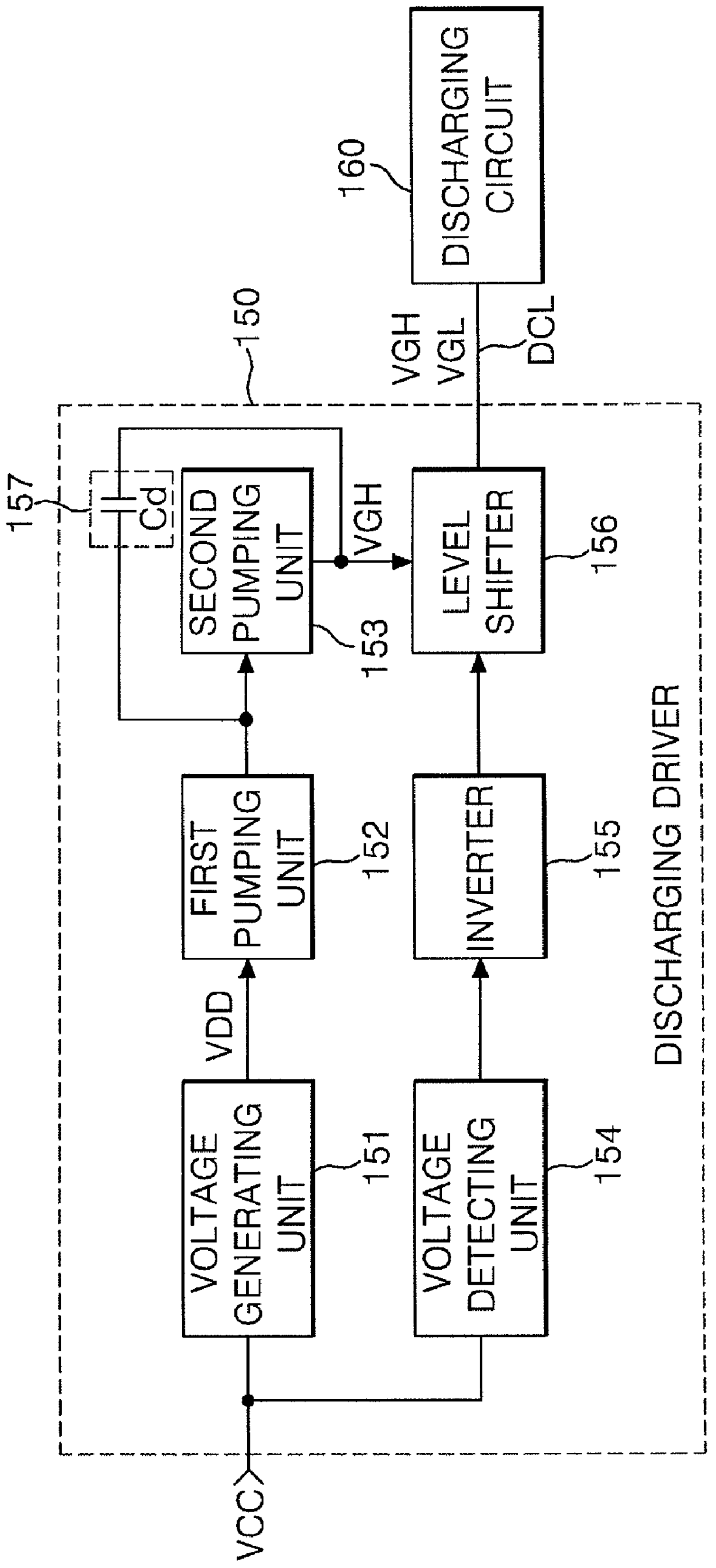
FIG. 3 is a diagram of illustrating one embodiment of discharging driver shown in FIG. 2.

FIG. 3 is a diagram of illustrating one embodiment of discharging driver shown in FIG. 2.

Referring to FIG. 3, the discharging driver 150 includes a voltage generating unit 151, a first pumping unit 152, a second pumping unit 153, a voltage detecting unit 154, an inverter 155, a level shifter 156, and a delay device 157. At this time, the voltage generating unit 151 generates the high-potential power source voltage VDD with the D.C. power source voltage VCC applied thereto. The first pumping unit 152 firstly pumps the high-potential power source voltage VDD output from the voltage generating unit 151. The second pumping unit 153 generates the gate high voltage VGH by secondarily pumping the high-potential power source voltage VDD firstly pumped in the first pumping unit 152. The voltage detecting unit 154 detects the level of the D.C. power source voltage VCC applied, and outputs the low voltage (0V) or high voltage VCC having the level corresponding to that of the power source voltage (VCC) according to the detected level of the D.C. power source voltage VCC. Also, the inverter 155 inverts the high voltage VCC or low voltage (0V) output from the voltage detecting unit 154, and outputs the high voltage VCC or low voltage (0V). The level shifter 156 shifts the level of low voltage (0V) output from the inverter 155, and outputs the gate low voltage VGL to the discharging circuit 160. Also, the level shifter 156 shifts the level of high voltage VCC output from the inverter 155, and outputs the gate high voltage VGH to the discharging circuit 160. The delay device 157 maintains the gate high voltage VGH supplied to the discharging circuit 160 from the level shifter 156 at a preset period of time.

The voltage generating unit 151 receives the D.C. power source voltage VCC, generates the high-potential power source voltage VDD, and outputs the generated high-potential power source voltage VDD to the first pumping unit 152.

At this time, the high-potential power source voltage VDD is the highest among the voltages supplied to the liquid crystal display panel 110, wherein the high-potential power source voltage VDD is higher than the power source voltage VCC.

The first pumping unit 152 firstly pumps the high-potential power source voltage VDD output from the voltage generating unit 151, and outputs the firstly pumped high-potential power source voltage VDD to the second pumping unit 153. Also, the second pumping unit 153 secondarily pumps the high-potential power source voltage VDD firstly pumped in the first pumping unit 152, and outputs the gate high voltage VGH having the same level as the high level of scan pulse to the level shifter 156.

Figure 4:
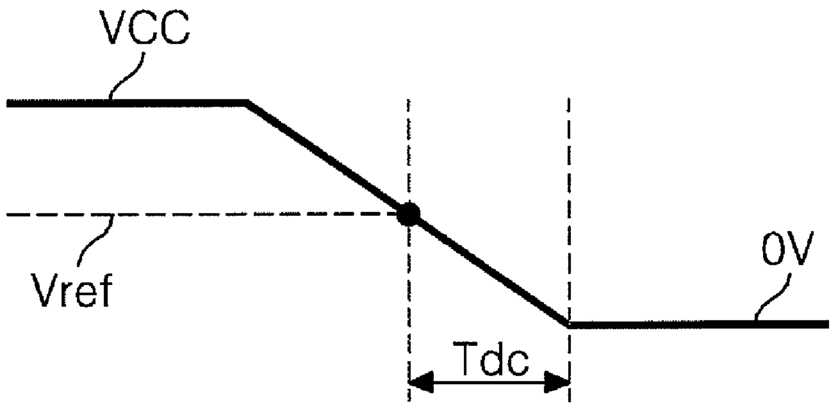
FIG. 4 is a diagram of illustrating properties of power-source voltage supplied to a liquid crystal display device shown in FIG. 2.

The voltage detecting unit 154 detects the level of the D.C. power source voltage VCC supplied to the liquid crystal display device 100, compares the detected level of the D.C. power source voltage VCC with a preset reference voltage level, and outputs the high voltage VCC having the level of power source voltage VCC or low voltage (0V) to the inverter 155 according to the comparison result. As shown in FIG. 4, if the level of voltage detected is higher than the preset reference voltage level Vref, the voltage detecting unit 154 outputs the high voltage VCC having the level of power source voltage VCC to the inverter 155, thereby preventing discharging of remaining charges from each pixel.

If the level of voltage detected is lower than the preset reference voltage level Vref, the voltage detecting unit 154 outputs the low voltage (0V) to the inverter 155, thereby discharging the remaining charges from each pixel. That is, as shown in FIG. 4, the voltage detecting unit 154 detects the point where the level of power source voltage VCC starts to drop, starts discharging of each pixel at the point where the level of power source voltage VCC is lowered below the preset reference voltage level Vref, and performs the discharging of each pixel for a discharging period Tdc.

If the high voltage VCC is input from the voltage detecting unit 154, the inverter 155 inverts the level of high voltage VCC, and outputs the low voltage (0V) to the level shifter 156. If the low voltage (0V) is input from the voltage detecting unit 154, the inverter 155 inverts the level of low voltage (0V), and outputs the high voltage VCC to the level shifter 156.

If the low voltage (0V) is input from the inverter 155, the level shifter 156 shifts the level of low voltage (0V) to the level below 0V, and outputs the gate low voltage VGL of about −5V to the discharging circuit 160 through the discharging line DCL. The thin film transistors TFT included in the discharging circuit 160 are turned-off by the gate low voltage VGL from the level shifter 156, thereby preventing discharging of each pixel.

If the high voltage VCC is input from the inverter 155, the level shifter 156 shifts the level of high voltage VCC to the level of gate high voltage VGH from the second pumping unit 153, and outputs the gate high voltage VGH having the same level as that of the scan pulse to the discharging circuit 160 through the discharging line DCL. At this time, the thin film transistors TFT included in the discharging circuit 160 are turned-on by the gate high voltage VGH from the level shifter 156, thereby performing discharging of remaining charges of each pixel.

The delay device 157 is comprised of one low-capacitance capacitor Cd between input and output sides of the second pumping unit 153. The low-capacitance capacitor Cd maintains the gate high voltage VGH supplied to the discharging circuit 160 from the level shifter 156 for the discharging period Tdc.

Figure 5:
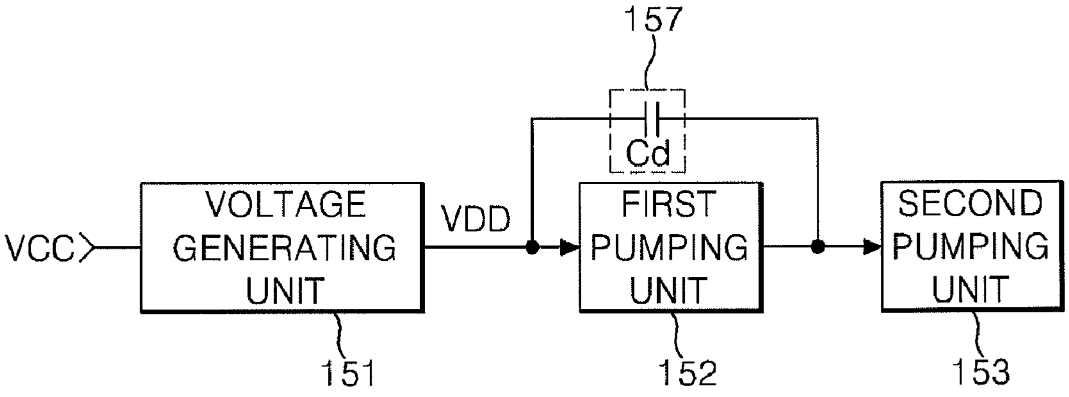
FIG. 5 is a diagram of illustrating another embodiment of discharging driver shown in FIG. 2.

As shown in FIG. 5, the capacitor Cd of delay device 157 may be connected between input and output sides of the first pumping unit 152.

The liquid crystal display device according to the present disclosure discloses that the delay device 157 includes one capacitor Cd, but it is not limited thereto. In another aspect, the delay device 157 may be provided with at least two capacitors connected in parallel or in series.

Accordingly, one capacitor may be connected between both lateral sides of the first pumping unit 152, or may be connected between both lateral sides of the second pumping unit 153, thereby maintaining the gate high voltage VGH supplied to the discharging circuit 160 for the discharging period. As a result, the liquid crystal display device according to the present disclosure decreases fabrication cost, simplifies the circuit structure and improves the spatial efficiency.

As mentioned above, the liquid crystal display device according to the present disclosure and the driving method thereof have the following advantages.

The liquid crystal display device according to the present disclosure minimizes the number of delay devices needed to delay the discharging time for each pixel by the preset period of time. As a result, the liquid crystal display device according to the present disclosure decreases the fabrication cost, simplifies the circuit structure and improves the spatial efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:

a first pumping unit that first pumps a high-potential power source voltage applied;

a second pumping unit that generates a gate high voltage by pumping the high-potential power source voltage first pumped in the first pumping unit;

a voltage detecting unit for detecting a level of a D.C. power source voltage applied, comparing the detected level of the D.C. power source voltage with a preset reference voltage level, and outputting a low voltage or high voltage according to the comparison result, wherein the voltage detecting unit outputs the high voltage when the level of voltage detected is higher than the preset reference voltage level and outputs the low voltage when the level of voltage detected is lower than the preset reference voltage level;

a inverter for inverting the low voltage or high voltage output from the voltage detecting unit;

a level shifter that shifts the high voltage inverted from the inverter to a level corresponding to that of the gate high voltage from the second pumping unit, and supplies the gate high voltage to a discharging circuit through a discharging line, wherein the discharging circuit includes a plurality of discharging parts and input sides of the discharging parts are connected to the discharging line in common and output sides of the discharging parts are connected in one-to-one correspondence with gate lines; and a delay device, connected between input and output sides of the second pumping unit, that maintains the gate high voltage output from the level shifter for a preset period of time, wherein the discharging parts discharge through data lines remaining charges from pixels connected to the gate line by supplying the gate high voltage from the level shifter to the gate line.

2. The liquid crystal display device of claim 1, wherein the delay device is comprised of at least one capacitor connected between the input and output sides of the second pumping unit.

3. The liquid crystal display device of claim 2, wherein the at least one capacitor corresponds to a low-capacitance capacitor.

4. The liquid crystal display device of claim 1, wherein the delay device is comprised of a plurality of capacitors connected in parallel or in series.

5. The liquid crystal display device of claim 1, wherein the delay device is comprised of a plurality of capacitors connected in parallel or in series and the plurality of capacitors correspond to a low-capacitance capacitor.

6. A liquid crystal display device comprising:

a first pumping unit that first pumps a high-potential power source voltage applied;

a second pumping unit that generates a gate high voltage by pumping the high-potential power source voltage first pumped in the first pumping unit;

a voltage detecting unit for detecting a level of a D.C. power source voltage applied, comparing the detected level of the D.C. power source voltage with a preset reference voltage level, and outputting a low voltage or high voltage according to the comparison result, wherein the voltage detecting unit outputs the high voltage when the level of voltage detected is higher than the preset reference voltage level and outputs the low voltage when the level of voltage detected is lower than the preset reference voltage level;

a inverter for inverting the low voltage or high voltage output from the voltage detecting unit;

a level shifter that shifts the high voltage inverted from the inverter to a level corresponding to that of the gate high voltage from the second pumping unit, and supplies the gate high voltage to a discharging circuit through a discharging line, wherein the discharging circuit includes a plurality of discharging parts and input sides of the discharging parts are connected to the discharging line in common and output sides of the discharging parts are connected in one-to-one correspondence with gate lines; and a delay device, connected between input and output sides of the first pumping unit, that maintains the gate high voltage output from the level shifter for a preset period of time, wherein the discharging parts discharge through data lines remaining charges from pixels connected to the gate line by supplying the gate high voltage from the level shifter to the gate line.

7. The liquid crystal display device of claim 6, wherein the delay device is comprised of at least one capacitor connected between input and output sides of the first pumping unit.

8. The liquid crystal display device of claim 7, wherein the at least one capacitor corresponds to a low-capacitance capacitor.

9. The liquid crystal display device of claim 6, wherein the delay device is comprised of a plurality of capacitors connected in parallel or in series.

10. The liquid crystal display device of claim 6, wherein the delay device is comprised of a plurality of capacitors connected in parallel or in series and the plurality of capacitors correspond to a low-capacitance capacitor.

11. A method of driving a liquid crystal display device comprising:

first pumping a high-potential power source voltage by a first pumping unit;

generating a gate high voltage by pumping the high-potential power source voltage first pumped in the first pumping unit by a second pumping unit;

detecting a level of a D.C. power source voltage applied, comparing the detected level of the D.C. power source voltage with a preset reference voltage level, and outputting a low voltage or high voltage according to the comparison result, wherein the voltage detecting unit outputs the high voltage when the level of voltage detected is higher than the preset reference voltage level and outputs the low voltage when the level of voltage detected is lower than the preset reference voltage level;

inverting the low voltage or high voltage output from the voltage detecting unit by a inverter;

supplying a gate low voltage to a discharging circuit by a level shifter when a low voltage inverted from the inverter is inputted to the level shifter;

shifting the high voltage inverted from the inverter to a level of the gate high voltage generated in the second pumping unit by the level shifter, and supplying the gate high voltage to the discharging circuit, when the high voltage is input to the level shifter through a discharging line, wherein the discharging circuit includes a plurality of discharging parts and input sides of the discharging parts are connected to the discharging line in common and output sides of the discharging parts are connected in one-to-one correspondence with gate lines; and maintaining the gate high voltage output from the level shifter for a preset period of time by a delay device connected between input and output sides of the second pumping unit, wherein the discharging parts discharge through data lines remaining charges from pixels connected to the gate line by supplying the gate high voltage from the level shifter to the gate line.

12. The method of claim 11, wherein the delay device is comprised of at least one capacitor connected between the input and output sides of the second pumping unit.

13. A method of driving a liquid crystal display device comprising:

first pumping a high-potential power source voltage by a first pumping unit;

generating a gate high voltage by pumping the high-potential power source voltage firstly pumped in the first pumping unit by a second pumping unit;

detecting a level of a D.C. power source voltage applied, comparing the detected level of the D.C. power source voltage with a preset reference voltage level, and outputting a low voltage or high voltage according to the comparison result, wherein the voltage detecting unit outputs the high voltage when the level of voltage detected is higher than the preset reference voltage level and outputs the low voltage when the level of voltage detected is lower than the preset reference voltage level;

inverting the low voltage or high voltage output from the voltage detecting unit by a inverter;

supplying a gate low voltage to a discharging circuit by a level shifter when the low voltage is inputted to the level shifter;

shifting the high voltage inverted from the inverter to a level of the gate high voltage generated in the second pumping unit by the level shifter, and supplying the gate high voltage to the discharging circuit, when the high voltage is input to the level shifter through a discharging line, wherein the discharging circuit includes a plurality of discharging parts and input sides of the discharging parts are connected to the discharging line in common and output sides of the discharging parts are connected in one-to-one correspondence with gate lines; and maintaining the gate high voltage output from the level shifter for a preset period of time by a delay device connected between input and output sides of the first pumping unit, wherein the discharging parts discharge through data lines remaining charges from pixels connected to the gate line by supplying the gate high voltage from the level shifter to the gate line.

14. The method of claim 13, wherein the delay device is comprised of at least one capacitor connected between the input and output sides of the first pumping unit.

* * * * *